May 11, 1937.　　　C. B. FRANCIS　　　2,079,848
MAKING STEEL
Filed Nov. 7, 1935
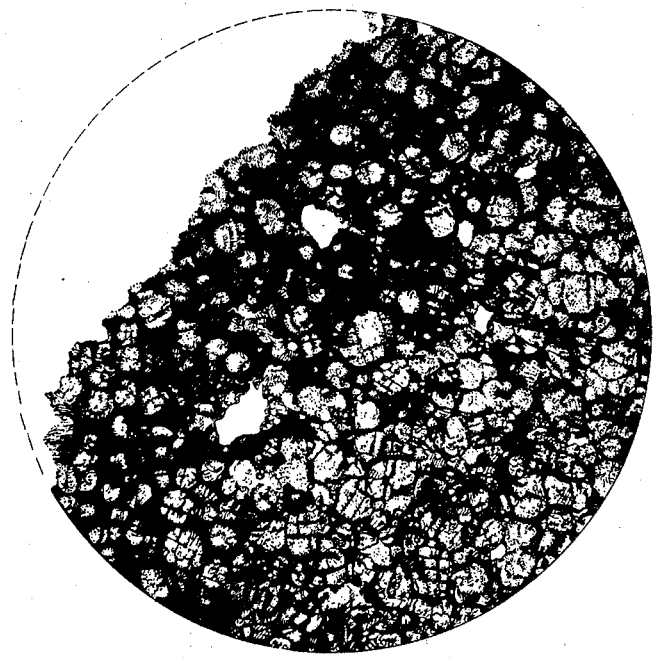
INVENTOR:
CHARLES B. FRANCIS,
BY Usina + Tauber
his ATTORNEYS.

Patented May 11, 1937

2,079,848

UNITED STATES PATENT OFFICE 2,079,848

MAKING STEEL

Charles B. Francis, Pittsburgh, Pa.

Application November 7, 1935, Serial No. 48,746

5 Claims. (Cl. 75—46)

The invention provides certain improvements directed particularly to the dephosphorizing of Bessemer steel, and generally to the making of steel from ores containing phosphorus.

In the acid Bessemer process molten pig iron containing phosphorus (usually about 0.08%) is charged through a converter, either alone or with a limited amount of scrap or iron oxide, or both. The vessel is lined with a siliceous refractory. The molten metal is blown and the oxygen of the air combines with the silicon, manganese and carbon of the charge. The oxides of silicon and manganese form a floating slag and the oxide of carbon passes off as a gas. Practically all the phosphorus contained in the charge remains in the steel. Where the charge is especially high in phosphorus, a basic lined converter has been used and, the charge being mixed with some oxide of iron and lime, part of the phosphorus of the charge is separated as a slag. The oxidation reactions are exothermic and supply the heat necessary to maintain the metal molten. After the blow the metal is poured from the converter for such further recarburizing, deoxidizing or other treatment that may be desired.

There is very little ore in the United States from which pig iron can be made containing enough phosphorus to make the basic Bessemer process practicable. The Bessemer practice is chiefly an acid process. However, all the ores here contain phosphorus, practically none being under 0.02% phosphorus. But this percentage, 0.02, is the limit above which it has not been possible in commercial practice to get a steel with as low as 0.05% phosphorus, the maximum permitted in most steel specifications (excepting certain special grades and products as sheets, pipe and wire). Consequently, the Bessemer process has gradually been displaced in this country to a great and increasing extent by the basic open hearth process, which has certain disadvantages not pertinent here.

Many attempts have been made to improve the acid pneumatic process, particularly so as to get an acid Bessemer steel, starting with an ore having more than 0.02% phosphorus, which would contain less than 0.05% phosphorus, the maximum permitted in most specifications for steel, except that used for common grades of sheets, pipe and wire.

In the simplest application of the process of my invention I purify the pig iron in an acid lined converter in the usual way and control the deoxidation conditions and the phosphorus content of the steel by pouring in such a way as to effect complete separation of the metal from the slag, and by treating the metal as it is poured into the ladle with a special mixture added in the solid state, and casting in the usual way. These operations of the process of my invention require little equipment beyond that essential to the usual practice, the only additional equipment being some means of holding the slag in the converter while the purified metal is poured therefrom, and an extra steel ladle of the usual type when it is desired to produce certain special grades of steel.

In carrying out the process of my invention in this simple manner, various modifications may be made to control the oxygen and the phosphorus content, according to the type of steel to be made. It will be understood by those skilled in the art that this control under these operating conditions can extend only to within certain limits, the maximum of which are fixed by the oxygen and phosphorus in the metal and its temperature as it comes from the converter.

In the process as carried out heretofore all the phosphorus charged into the vessel remains in the metal, while the oxygen will vary according to the extent of the blowing. It is generally believed, and my investigations confirm this belief, that the oxygen exists in the blown metal as the compound FeO, which is held in solution by the liquid metal. In the Bessemer process the conditions of blowing are such that the liquid metal is kept saturated with FeO, but the amount that can be held in solution is affected by the proportion of carbon present, the carbon reacting with the FeO, until equilibrium is established, and in accordance with the following reaction—

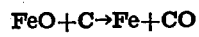

$$FeO+C \rightarrow Fe+CO$$

Only carbon need be considered in relation to the oxygen at the end of the purifying period, because both the silicon and the manganese will have been eliminated in any case.

In the usual Bessemer practice it is customary to blow the carbon down to some point below 0.10%, and add carbon as required in the finished steel. I have found that if the blowing is stopped with about 0.06% carbon the FeO will be approximately 0.35%, while if the metal is full blown to reduce the carbon to 0.04% or less, the metal will contain about 0.50% FeO. Control of the FeO content of the steel is important, because it affords a means of producing different types of low carbon steel known as rimming steel, semi-killed steel, and killed steel.

The former type is prized particularly for such materials as sheets because of its freedom from surface defects, and is produced by controlling conditions so that there is a rapid evolution of gases as the steel solidifies in the mold. This evolution of gases is largely regulated by controlling the FeO in the metal, which reacts with the carbon to form the gas carbon monoxide, CO, though some hydrogen and nitrogen may also be evolved. In making semi-killed steels control of the FeO is even more important, as it is a source of blow holes in the ingot. In making killed steels FeO is completely eliminated, usually by the addition of deoxidizers which react with the FeO held in solution by the metal to form compounds that do not react with carbon or form any other gaseous products. Deoxidizers available for this purpose are ferromanganese, spiegel, silico-manganese, ferro-titanium, ferro-silicon, ferro-aluminum and metallic aluminum.

In making Bessemer steel by the practices of the prior art, the slag is permitted to flow out of the vessel with the steel and to form a covering over the liquid metal. This slag is composed of 50 to 70 per cent silica, and 30 to 50 per cent of oxides of iron, manganese and alumina combined with the silica as silicates. Usually this slag is in a semi-fluid condition at the end of the blow, though the fluidity may vary considerably. This slag affects the quality of the steel produced and limits the types of steel it is possible to produce by the process. Becoming mixed with the metal in pouring, it will not always rise to the surface, though the density of the metal is more than twice that of the slag.

Slag thus mixed with and remaining in the metal is a cause of defects known as blisters, laminations and macroscopic inclusions. This slag also interferes with the deoxidation of the blown metal, because the more active deoxidizers, such as metallic aluminum and ferro-aluminum, being less dense than the molten iron, tend to float on the surface of the metal. There they are in contact with the slag before they can be absorbed by and alloyed with the metal to react with the FeO dissolved therein. Hence, heavy alloys such as ferro-manganese, or those containing only a small proportion of the deoxidizing agent, such as ferro-titanium, are the only deoxidizers that have been successfully used in the making of Bessemer steel. Separation of the metal from the vessel slag is, therefore, the first step in the control of deoxidizing conditions.

In making rimming and semi-killed steels the phosphorus is also important, as it tends to segregate toward the top central portion of the ingot. When the steel is rolled into products such as sheets and skelp, the high phosphorus areas increase the hardness and stiffness of the steel in these areas with the result that the product lacks uniformity. This is one of the reasons why users prefer steels of this type to be made by the basic open hearth process, and for the decline of the Bessemer process and growth of the former.

Another reason is that, while as much as .08% phosphorus is to be considered harmless in steel, contributing to increase the tensile strength like carbon, more than 0.100% is objectionable in all steels that are to be subjected to shock or vibration in service. Heretofore, the phosphorus in Bessemer steel could be held below .080% only by the careful selection and grading of the ores.

To show how the process of this invention overcomes these faults of the Bessemer process, and to illustrate the different ways in which it may be applied to improve the quality of ordinary Bessemer steel and increase the types of steel it is possible to produce by this process with but slight changes in the design of the converter and no additional equipment, I cite the following specific examples.

Assuming it is required to make low phosphorus rimming steel comparable with rimming steel made by the basic open hearth process, in the process of my invention I make low phosphorus rimming steel as follows: The molten pig iron is charged into an acid lined converter of the usual type, with or without scrap, according to grade of pig iron used, and blown in the usual way.

In tapping or pouring from the converter the slag is held back as far as possible. The slag-free blown metal is poured into a ladle in which there is also introduced in solid form a special reagent comprising a mixture of iron and calcium compounds. This reagent deoxidizes and dephosphorizes the metal to an extent controlled by the quantity of the reagent.

The dephosphorizing agent consists of a specific mixture of two ingredients. One of these consists essentially of di-calcium ferrite, usually with an excess of calcium oxide, obtained as a reaction product between CaO and $Fe_2O_3$ when a pure form of limestone is calcined in the presence of iron oxides. The other ingredient is calcium fluoride in the form of fluorspar, or some other basic and oxygen-free substance fusing at a comparatively low temperature. The fluorspar plays no part in the oxidation of the phosphorus, though its use is generally desirable and, under certain conditions, it may increase the efficiency of the dephosphorizing mixture. The chief function of the fluorspar is to lower the fusion temperature of the mixture, particularly when a large amount must be used. It is also desirable to lower the fusion temperature of the mixture, especially when the dephosphorizing part of the process is carried out in the ladle, in order to form a liquid slag that will cover the metal and protect it from the air during the teeming operation and remain fluid until the ladle has been emptied. Other basic or neutral substances, such as calcium chloride, may serve this purpose as well and, under some conditions, the use of a melting point depressant of any kind may not be necessary.

Intimate physical mixture of di-calcium ferrite and calcium oxide, obtained in the manner mentioned above, or of di-calcium ferrite alone, is important to make the process consistently successful.

The mixture found most satisfactory for the purpose is prepared by mixing from 5 to 15 parts of some pure form of iron oxide, such as a pure hematite ore or roll scale with 85 to 95 parts of a comparatively pure amorphous limestone, and calcining this mixture at a temperature slightly above 2650° F., in a rotary kiln such as is used in producing quicklime from limestone. These proportions are those it has been found most practicable to use, but the successful operation of the process is not limited thereto, as iron oxide up to 30 parts or more to give a product corresponding as nearly as possible to the chemical formula $2CaO.Fe_2O_3$, which represents a compound containing 58.8% $Fe_2O_3$, should prove to be most efficient. In the process of manufacturing the iron oxide-lime mixture it may assume a semi-fused state, but does not become completely fused at any stage of the process. Following the calcining operation, the material may be crushed to pass a half-inch screen, as it is preferably mixed with the fluorspar and added to the steel in this form. The result of this treatment is to give the calcined product a peculiar structure which consists of minute particles or grains of crystalline calcium oxide each completely enveloped by a network or matrix of di-calcium ferrite.

This structure is plainly shown in the accompanying drawing, being a photomicrograph of a cross-section of a small lump of the calcium ferrite-calcium oxide reaction product forming a part of the special dephosphorizing mixture. It should be noted that this photomicrograph is of material containing about 15% ferric oxide. If the proportion of iron oxide is increased, the particles of CaO become fewer in number and disappear entirely as the composition approaches that of pure di-calcium ferrite.

In the steel as blown, the phosphorus is held in solution in the liquid metal probably in the form of a compound $Fe_3P$. In the presence of an excess of iron oxide it is oxidized by a chemical action which is represented by the following reversible reaction:

$$2Fe_3P + 8FeO \rightleftarrows Fe_3P_2O_8 + 8Fe$$

At low temperatures the ferric phosphate, $Fe_3P_2O_8$, thus formed will either separate or dissolve in the slag. At high temperatures it is immediately reduced by the excess iron present so that with a great excess of iron present, as there is in purified liquid metal, the phosphorus is not oxidized permanently even though a considerable excess of iron oxide is mixed with the metal. If free lime is present, however, the lime replaces the iron in the ferric phosphate according to the following reaction:

$$Fe_3P_2O_8 + 3CaO \rightarrow Ca_3P_2O_8 + 3FeO$$

If the conditions are right, calcium phosphate forms a slag, but if the conditions are slightly reducing, and particularly if sufficient silica is present, the calcium phosphate reverts through iron phosphate back to the phosphide, $Fe_3P$, which dissolves in or alloys with the steel. These reactions take place with great rapidity when both the metal and the treating agents are in the liquid phase or state. When the treating agent is in the solid state or semi-solid state, the reactions at the surface of contact between liquid metal and the solid take place just as rapidly, but the efficiency is impaired because much of the solid cannot contact the liquid. Again, in order to fix the phosphorus and remove it from the metal, it is necessary in all cases that a certain excess of calcium oxide over that required to neutralize the silica present be at hand when the oxidation takes place. In the processes of the prior art of iron and steel making, the conditions are favorable to the reversible reactions, and the oxidation and elimination of the phosphorus from the metal is, therefore, comparatively slow in some processes and uncertain in others.

The process of this invention differs from all others in that I exclude silica so far as possible, add the dephosphorizing mixture in the solid state, and effect the dephosphorization of the metal, at high temperature and in a few seconds of time, with double compounds of calcium and iron oxides rather than physical mixtures of limestone and iron oxides or of calcium oxide and iron oxide.

To lower the phosphorus in the steel from 0.100% to 0.070% I may add about 300 pounds of the mixture. To lower the phosphorus to 0.040% I require about 600 pounds. For ordinary low carbon steel, the requisite amount of deoxidizer in the form of ferro-manganese is added at any time during the pouring of the steel and either before or after, but preferably just before, the addition of the special mixture of iron and calcium compounds, and the steel is teemed into molds in the usual way. The exact procedure to be followed depends upon the content of manganese and phosphorus desired in the finished steel.

The proper amount of deoxidizers is added also in accordance with the amount of steel to be produced, and the metal, after it has all been poured, is covered with a low melting slag such as blast furnace slag, which is free from phosphorus and oxides of iron.

It may be desired to produce a steel deoxidized to a greater or less extent. The application of the special dephosphorizing agent referred to above results in the production of steel with a certain percentage of oxygen or iron oxide therein. A certain amount of oxygen is present in rimming steel, but for many product semi-killed or fully killed steel is desired, with most or practically all of the oxide removed. Deoxidization cannot be effected by adding ferro-silicon to the steel in the same vessel in which dephosphorization is to be attempted, as the silicon reacts with the dephosphorizing compound, destroying its effectiveness. In removing the oxide, the exact procedure to be followed depends on the content of phosphorus desired in the finished steel.

If the phosphorus desired is below 0.100%, the usual average for Bessemer steel, the molten pig iron is purified as described above, using either Bessemer or low phosphorus iron, and the deoxidation is controlled in either one of two ways, according to the type of steel desired; and the desired amount of phosphorus is removed through the amount of the special mixture added and its composition, as described above.

In one method of deoxidizing, blast furnace ferro-silicon is added to the steel in the converter at the end of the blow and just before the metal is poured from the vessel, the amount added being governed by the extent to which it is desired to remove the FeO according to the following reaction:

$$Si + FeO \rightarrow FeSiO_3$$

The ferro-manganese is added to the ladle as hereinbefore described for low phosphorus rimming steel.

In another method the steel is deoxidized to the desired extent by adding aluminum or ferro-aluminum to the liquid steel in the mold after the phosphorus has been removed by addition of the mixture of iron-calcium compounds to the ladle as described above.

If required to make semi-killed higher phosphorus steels, one may proceed in the same way as described for low phosphorus semi-killed steel, the only change necessary being in the amount of the special mixture of iron and calcium compounds added.

If required to make low phosphorus fully killed steels, one may proceed as described for low phosphorus rimming steel, adding the ferromanganese to the same ladle to which the special dephosphorizing mixture is added. In some cases the other deoxidizers may also be added to the same ladle. However, if energetic deoxidizers such as metallic aluminum, ferro-aluminum or ferro-titanium are required, it is preferred to separate the metal from the special dephosphorizing mixture, and add the deoxidizers, except the ferro-manganese, in such a way as to avoid direct contact with the dephosphorizing mixture, which contains the phosphorus abstracted from the steel.

In addition to the ordinary types of steel described above, one is able by the process of this invention to produce a new type of steel, as is evident from the following explanation. Ingot iron containing a minimum of impurities is desirable for many purposes, and prior to the process of this invention this material was most satisfactorily made by the basic open hearth process. I have found, and indeed it is well known, that it is practicable to blow pig iron in the Bessemer converter until practically all the silicon is eliminated and the carbon and the manganese are reduced to about 0.02% for each of these elements. Metal containing about this amount of carbon and manganese, but more sulphur and phosphorus, has been made by the Bessemer process. In making such a product, however, it is very difficult and expensive to produce material containing less than 0.05% phosphorus for reasons already given herein.

By the process of this invention, however, metal has been produced that contained no more than 0.02% phosphorus from the ordinary grade of Bessemer pig iron containing from 0.08 to 0.09% phosphorus. To produce such a pure iron by the process of this invention, charge the usual grade of pig iron, blow the metal a few seconds longer than usual to reduce the carbon and manganese to the desired point, then proceed as described herein for low phosphorus rimming steel, omitting the addition of ferro-manganese or adding not over 2.5 pounds per ton, and finish the process either by addition of deoxidizers as described above for fully killed low phosphorus steel, or by poling the metal in the ladle. When desired to eliminate practically all of the carbon and manganese as well as most of the phosphorus from the steel, the extreme full blowing of the metal in the converter may be avoided by mixing a pure form of iron oxide (such as roll scale) or high-grade dehydrated ore with the calcium ferrite, calcium fluoxide. A comparison of the product of the process of this invention with the purest forms of iron produced by other processes is given in the following table:

use of the special mixture to eliminate phosphorus from the metal subsequent to the blowing operation. The separation of the slag from the blown metal may be effected in various ways, or by special equipment and handling adapted to effect a more complete separation. The equipment which I propose would include a converter specially designed to facilitate separation of the slag, a special vessel in which the dephosphorizing operation is carried on and the deoxidation as far as necessary, and an electric furnace for melting special deoxidizers that are to be added after dephosphorization. After the blow, the liquid metal would be poured into the dephosphorizing vessel along with the dephosphorizing agent in solid form where the two would be quickly mixed and the metal poured thence into the ladle in which the final deoxidizing and recarburizing agents would be added in the liquid state.

The process carried out in this manner would permit the production of steel of any grade or type from pig iron either with or without the use of scrap and without the use of fuel other than that contained in the pig iron itself, this permitting the same control of purifying and finishing operations as in the basic open hearth and the electric processes, with the added advantage that no fuel or external energy in any form would be required.

Although I have described ways in which the process of my invention has been carried out and a plan that may be used most efficiently, it is not limited thereby, as it may be applied in various ways and with equipment of many different types or designs.

The reasons for the success which has been achieved with this process may be explained briefly as follows:

First, by separating the purified metal from the acid slag formed in oxidizing the manganese and silicon, I avoid the presence of silica, which is one of the factors causing reversion of phosphorus in the basic open hearth process, for example. In most of the old duplex processes, the metal to be dephosphorized is likewise separated from the siliceous slag, but the iron oxide and

|  | Electrolytic iron | Basic O. H. ingot iron | Iron by process of my invention | Iron by prior Bess. process | Ordinary basic O. H. ingot iron | Low carbon Bess. steel | Low carbon basic O. H. steel |
|---|---|---|---|---|---|---|---|
| C% | Trace | .015 | .02 | .02 | .04 | .06 | .08 |
| Mn | Trace | .015 | .02 | .02 | .08 | .30 | .30 |
| S | Trace | .02 | .025 | .03 | .03 | .03 | .035 |
| P | Trace | .01 | .02 | .05 | .01 | .10 | .01 |
| Si | Trace | .005 | .005 | .005 | .005 | .005 | .005 |
| Cu | .02 | .002 | .002 | .02 | .00/.01 | .00/.01 | .00/.01 |
| Ni | .002 | .00 | .00 | .00 | .00/.05 | .00/.05 | .00/.05 |
| Cr | .002 | .002 | .002 | .002 | .00/.05 | .00/.05 | .00/.05 |
| O (1) |  | .005 | .005 | .005 | .005 | .005 | .005 |
| Al | | .005 | .005 | .005 | .005 | .005 | .005 |
| N (2) | | .004 | .01 | .012 | .004 | .01 | .004 |
| H | | .003 | .003 | .002 | .002 | .002 | .001 |
| Total | Between 0.03 and .05. | .086 | .117 | .171 | .181 | .517 | .445 |

(1) Oxygen as FeO maximum.
(2) Total nitrogen.

Another advantage of the process is that one can make ordinary Bessemer steel containing not over 0.100% phosphorus from pig iron containing much more phosphorus, which heretofore has been classed as basic iron.

There are two very important features in the present process, namely, the separation of the blown metal from the converter slag and the the lime or limestone are either charged separately or as mechanical mixtures, and at the high temperature necessary to the operation, the iron oxide is rapidly reduced from $Fe_2O_3$ or $Fe_3O_4$ to FeO or mixtures of FeO and $Fe_3O_4$.

Second, ferric oxide, $Fe_2O_3$, is a more efficient agent for the oxidation of phosphorus than FeO. Now, at 1100° C. (2012° F.) $Fe_2O_3$ begins to decompose, the decomposition rate increasing rapidly as the temperature rises, as represented by the following reactions:

$$6Fe_2O_3 + heat \rightarrow 4Fe_3O_4 + O_2$$

and $$2Fe_3O_4 + heat \rightarrow 6FeO + O_2$$

If, however, a chemical union between calcium oxide and ferric oxide is effected in the manner described herein, the di-calcium ferrite formed is practically stable at all temperatures up to about 1480° C. (2700° F.) and from this temperature up to the temperatures of molten steel, about 1600° C. (2900° F.), it decomposes at a comparatively slow rate. Calcium oxide and ferric oxide unite to form mono-calcium ferrite $CaO.Fe_2O_3$, but this compound begins to decompose at 1272° C. (2321° F.), forming di-calcium ferrite, ferrous oxide and oxygen, thus—

$$2CaO.Fe_2O_3 + heat \rightarrow (CaO)_2Fe_2O_3 + 2FeO + O$$

This decomposition does not go to completion at 1272° C. in a short time but progresses more rapidly up to about 1500° C., which is the approximate temperature of the molten metal.

Therefore, the phosphorus in the steel is simultaneously oxidized and fixed by the action of calcium ferrites as represented by the following reaction:

$$6Fe_3P + 4(CaO)_2Fe_2O_3 + CaO.Fe_2O_3 \rightarrow 3(CaO)_3P_2O_6 + 28Fe$$

Since we take the precaution of excluding silica and silicates from the vessel in which the dephosphorization is effected, this reaction is not reversible; and the phosphorus is thus permanently eliminated from the metal, the only requirements being that the dephosphorizing mixture be added so as to mix with the metal and that the temperature of the latter be maintained sufficiently high to prevent solidification prematurely.

The iron oxide, which is essential to the oxidation of the phosphorus, and the calcium oxide, which is necessary to fix the phosphoric oxides, are thus combined in the calcium ferrites, and in a condition most favorable to the function each has to perform in the process.

In addition to the dephosphorizing action of the special mixture of calcium ferrites, calcium oxide, and calcium fluoride, I have evidence that it exerts a deoxidizing influence also. For example, in three heats, treated with the mixture, the purified metal as it was poured from the converter contained .40, .40 and .41% FeO, and tests taken after the treatment and as the steel was being teemed into the molds showed the steel to contain 0.25, 0.25 and 0.26% FeO, respectively.

Conversely, the same reagent can be made an intense oxidizing agent for the oxidation and elimination of manganese or silica by mixing it with a highly silicious material, such as sand or the slag formed in the converter. Under these conditions the calcium ferrite is decomposed forming calcium silicate and free ferric oxide, which at the high temperature of molten steel decomposes to form ferrous oxide and oxygen which immediately combines with silicon, manganese, or iron. If the silicious material added does not contain enough active silica, $SiO_2$, to react with all the calcium oxide in the calcium ferrite some phosphorus may also be oxidized and removed. Otherwise, no phosphorus will be eliminated.

Various modifications of the particular materials, processes and products described may be made by those skilled in the art without departing from the invention as defined in the following claims.

I claim:

1. The process of treating pig iron containing at least 0.04 per cent phosphorus which includes blowing said pig iron in an acid Bessemer converter, separating substantially all of the slag formed thereby from the blown metal, and mixing the substantially slag-free blown metal with a dephosphorizing agent comprising a solid reaction product obtained by heat treating a mixture of limestone and iron oxide at a temperature sufficient to calcine the limestone and combine part of the resulting lime with the iron oxide.

2. The process of treating pig iron containing at least 0.04 per cent phosphorus which includes blowing said pig iron in an acid Bessemer converter, separating substantially all of the slag formed thereby from the blown metal, and mixing the substantially slag-free blown metal with a dephosphorizing agent comprising a solid reaction product obtained by heat treating a mixture of limestone and iron oxide at a temperature sufficient to calcine the limestone and combine part of the resulting lime with the iron oxide together with a fusion-point depressant, such as fluorspar.

3. The process of treating pig iron containing at least 0.04 per cent phosphorus which includes blowing said pig iron in an acid Bessemer converter, separating substantially all of the slag formed thereby from the blown metal, and mixing the substantially slag-free blown metal with solid di-calcium ferrite.

4. The process of treating pig iron containing at least 0.04 per cent phosphorus which includes blowing said pig iron in an acid Bessemer converter, separating substantially all of the slag formed thereby from the blown metal, and mixing the substantially slag-free blown metal with solid di-calcium ferrite together with a fusion-point depressant, such as fluorspar.

5. The process of treating pig iron containing at least 0.04 per cent phosphorus which includes blowing said pig iron in an acid Bessemer converter, separating substantially all of the slag formed thereby from the blown metal, and mixing the substantially slag-free blown metal with a dephosphorizing agent comprising a solid reaction product having calcium oxide embodied in a matrix of calcium ferrites, said calcium ferrites being obtained by heat treating a mixture of limestone and iron oxide at a temperature sufficient to calcine the limestone and combine part of the resulting lime with the iron oxide.

CHARLES B. FRANCIS.